United States Patent [19]

Negoro et al.

[11] Patent Number: 4,912,490

[45] Date of Patent: Mar. 27, 1990

[54] PRINTER FOR CONTINUOUS FORM WITH JUSTIFICATION CONTROL

[75] Inventors: Ikuo Negoro, Sakado; Kiyoshi Negishi, Tsurugashima; Masahiro Kita, Tokyo, all of Japan

[73] Assignee: Asahi Kogaku Kogyo, K.K., Tokyo, Japan

[21] Appl. No.: 195,653

[22] Filed: May 18, 1988

[30] Foreign Application Priority Data

May 19, 1987 [JP] Japan ................................ 62-121689

[51] Int. Cl.[4] ............................................ G01D 15/00

[52] U.S. Cl. ................................ 346/160; 346/107 R

[58] Field of Search .................... 346/160, 107 R, 108; 358/300, 302

[56] References Cited

U.S. PATENT DOCUMENTS 4,761,662 8/1988 Yoshimoto et al. ................ 346/160

OTHER PUBLICATIONS

U.S. Ser. No. 177,352, filed Apr. 1988, Kita et al.

U.S. Ser. No. 194,298, filed May 16, 1988, Negoro.

U.S. Ser. No. 195,661, filed Sep. 26, 1989, Negishi et al.

U.S. Ser. No. 218,866, filed Jul., 1988, Negoro et al.

*Primary Examiner*—Arthur G. Evans

*Attorney, Agent, or Firm*—Sandler & Greenblum

[57] ABSTRACT

A justification system for use in an electrophotographic printer. The justification system comprises a detector which detects pulses occuring at intervals each covering a segment of a continuous form. A counter coupled to the detector counts the number of main scannings over the surface of a photoconductive drum during the time to feed each segment, as confirmed in the detector. The counted value is compared with a reference value by a differential arithmetic unit, the output of which is fed to a speed control to control the feed speed of the continuous form. This compensates for the fluctuations in printing positions of each segment due to systematic errors such, as expansion of the continuous form.

22 Claims, 5 Drawing Sheets

PRINTER FOR CONTINUOUS FORM WITH JUSTIFICATION CONTROL

BACKGROUND OF THE INVENTION

This invention related to a printer which prints information on a continuous form by transferring toner images thereonto, and more particularly to a justification system for controlling the printing so as to accord with the rules on the continuous form.

Conventionally, there is known an image recording device that utilizes a so-called electrophotographic system, in which a surface of a photoconductive drum is exposed to light to form a latent image on the drum surface, toner is applied to the latent image to develop the image, and the developed image is transferred onto a recording sheet material and fixed by a fixing unit. Such image recording devices are chiefly employed in copying machines. In recent years, however, the image recording device is being utilized in a printer and the like for printing the output from a computer.

In a copying machine, in general, cut sheets are used as the recording sheet material, and a heat-roll fixing system is utilized, wherein the toner is fixed by a combination of heat and pressure. In addition, a presure fixing system has recently been developed, which is low in electric power consumption and which does not require a long amount of time for preheating the heat rolls.

However, in a printer it is desired to use a continuous recording form as the recording material, the recording material form being identical with that used in a conventional line-printer. The continuous recording form is a folded continuous recording form (hereinafter referred to simply as "continuous form") called a fan folded form which has sprocket holes formed therein along its edges. Perforation marks are provided at each of the folded sections to enable sheet sections to be easily severed from each other. Horizontal rules are marked at predetermined intervals in a longitudinal direction between the perforations with a predetermined positional relationship with respect to the sprocket holes.

In the above printer, a continuous form having carried thereon unfixed toner image is clamped and passed between a pair of rotating fixing rolls so that the toner image is fixed onto the continuous form.

Usually, the continuous form is driven to travel by rotation of the fixing rolls. The continuous form is transported at a speed that is adjusted to accord with a predetermined relationship between a print segment on the continuous form and a number of main scannings on the photoconductive drum.

In the meantime, the printer employing the fan-folded form defines a non-printing area around the perforation because the form is cut into separate sheets at the perforations after printing.

In the printer described above, however, expansion or contraction of the continuous form, due to humidity, variations in the diameter of the fixing rolls, changes in the thickness of the continuous form at the fixing rolls and so on, cause variation in the time to feed each print segment (equal time required for passing of the leading and tailing ends of the print segment at a certain point in the travel path of the continuous form). This variation influences the predetermined relationship between the print segment and the main scanning number, thus shifting the printing position relative to the rules.

Further, the motors that are utilized for scanning the photoconductive drum and the exposure system vary in their rmp (revolutions per minuite) due to variations in the supply voltage and ageing. Thus, even if each printing segment of the continuous form is fed at a constant rate, the associated area of the photoconductive drum is shifted out of position and the printing position slips away from the rules, resulting in an undesired impression.

Moreover, the continuation of the printing accumulates such errors, making the rules meaningless. In the worst case situation, printing occurs at the nonprinting areas around the perforations.

SUMMARY OF THE INVENTION

It is therefore an object of the invention to provide a justification system for use in an electrophotographic printer that employs a continuous form.

For the above purpose, according to the invention, there is provided a justification system for use in an electrophotographic printer in which the surface of a photoconductive drum is main scanned in the direction of the axis of the drum and a continuous form, which is fed at a predetermined speed by a feed mechanism and provided with a plurality of print segments, is printed electrophotographically, the justification system comprising:

means for monitoring a difference between a predetermined reference time and an actual time required for each segment of the continuous form to pass a certain point in the travel path of the continuous form; and means for controlling the feed speed of the continuous form based on the result of a detecting means.

DESCRIPTION OF THE ACCOMPANYING DRAWINGS

DESCRIPTION OF THE EMBODIMENTS

Figure 1:
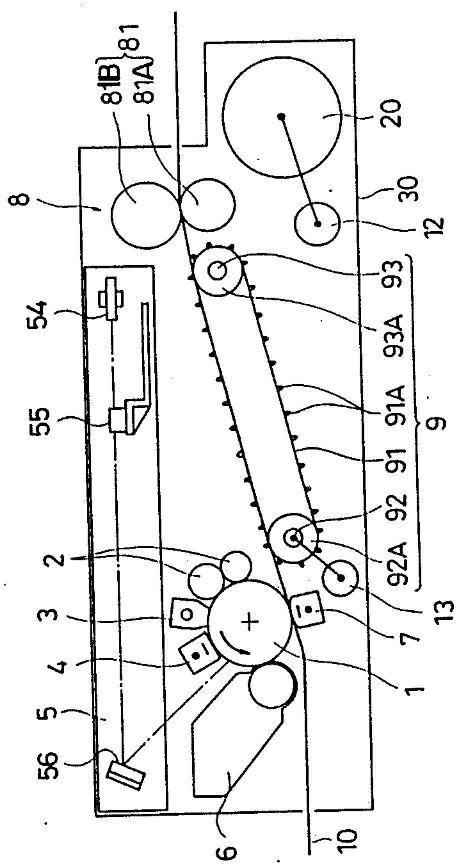
FIG. 1 is a side view of a printer having a justification system embodying the invention.
Figure 2:
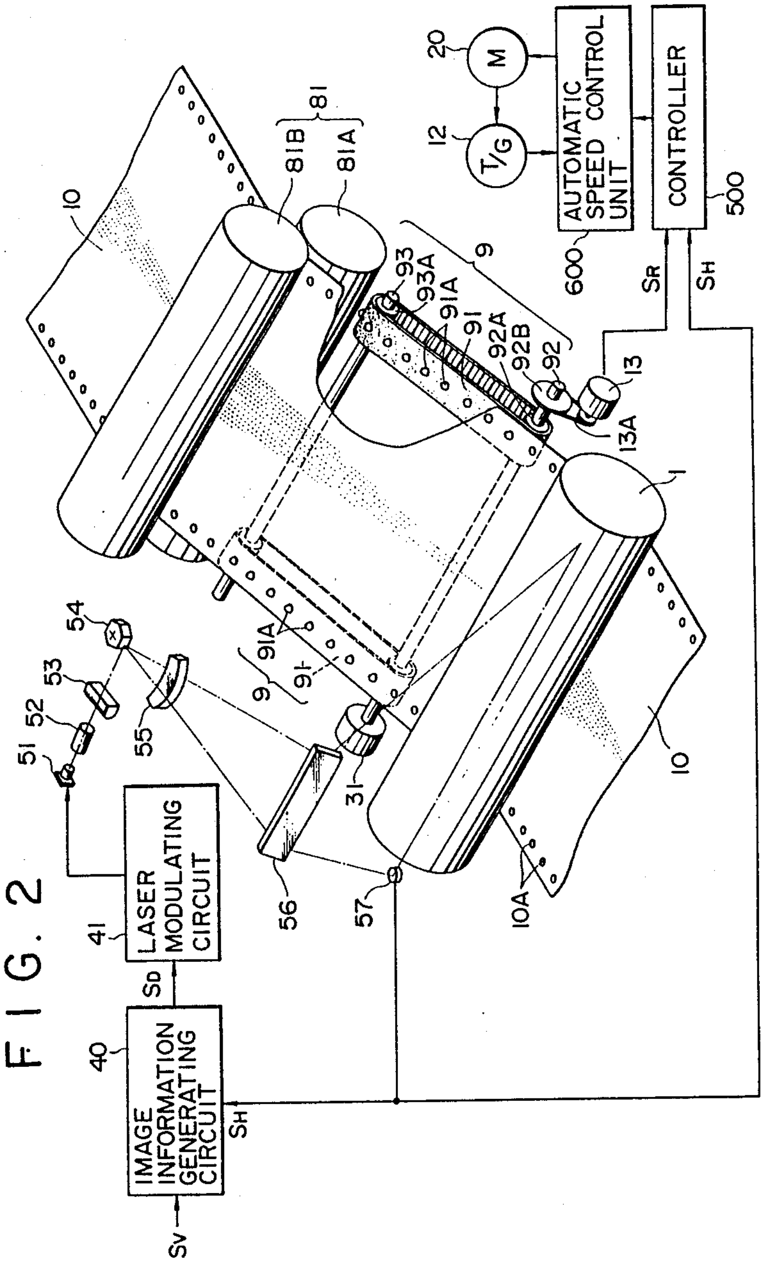
FIG. 2 is a perspective view showing principal parts of the printer of FIG. 1, with a functional block diagram of the justification system.

Referring to FIGS. 1 and 2, there is illustrated a laser beam printer, in which a fan-folded form 10 is used as a continuous recording form, and in which a justification system embodying the invention is incorporated. The laser beam printer is designed to print out information fed from a computer or the like, not shown, onto the fan-folded form 10 by means of an electrophotographic system.

The laser beam printer comprises a photoconductive drum 1. Arranged about the photoconductive drum 1 in due order in a rotational direction thereof indicated by the arrow in FIG. 1 are a toner-cleaning station 2, a de-charging station 3, a charging station 4, an optical scanning system 5 for directing a laser beam modulated on the basis of inputted information to the photoconductive drum 1, a developing station 6, and a transferring station 7. A fixing station 8 is arranged downstream of the photoconductive drum 1 with reference to the traveling direction in which the fan-folded form 10 travels along a predetermined path. A direction-regulating feed mechanism 9 is arranged in the predetermined path and at a location between the photoconductive drum 1 and the fixing station 8.

The optical scanning system 5 comprises a semi-conductive laser 51, a collimater lens 52, a beam shaper 53, a polygonal mirror 54, a $f\theta$ lens 55 and a reflecting mirror 56. The beam emission of the semi-conductor laser 51 is regulated by a laser beam modulating circuit 41. A modulating signal $S_V$ is fed into the beam modulating circuit 41 from an image information generating circuit 40, into which a signal $S_R$ is fed from a host computer, not shown.

The arrangement is such that the laser beam from the optical scanning system 5 scans the charged surface of the drum 1 along an axis thereof to carry out a main scanning, and the drum 1 is rotated to carry out an auxiliary scanning, to thereby form a latent image on the charged drum surface. Toner is applied at the developing station 6 to the latent image to develop the same. Subsequently, the developed toner image is transferred at the transferring station 7 onto the fan-folded form 10, driven to travel by the mechanism of the fixing station 8 at a velocity that is identical with the peripheral speed of the photoconductive drum 1. The transferred toner image on the fan-folded form 10 is fixed at the fixing station 8. The fan-folded form 10, having carried thereon the fixed image, is discharged out of the printer.

At the fixing station 8, a fixing roll pair 81 is arranged which comprises a pair of upper and lower pressure rolls 81A and 81B, having their respective axes extending perpendicularly to the traveling direction of the fan-folded form 10. A gap defined between outer peripheral surfaces of the respective upper and lower pressure rolls 81A and 81B of the fixing roll pair 81 is so set that when the fan-folded form 10 is clamped between both the pressure rolls 81A and 81B, the fan-folded form 10 is pressurized with a predetermined pressure.

The upper pressure roll 81B is drivingly connected to a DC (direct current) motor 20 through a chain, not shown. The upper pressure roll 81B is rotatabely driven by the motor 20 to clamp the fan-folded form 10 having carried thereon an unfixed image, between the upper and lower pressure rolls 81B and 81A. The upper and lower pressure rolls 81B and 81A cooperate with each other to pressurize the fan-folded form 10 so as to squeeze the unfixed image thereon, thereby fixing the image onto the fan-folded form 10. This is called a pressure-fixing system. The upper and lower pressure rolls 81B and 81A also cooperate with each other to drive the fan-folded form 10 to travel along the predetermined path, to discharge the fan-folded form 10 having carried thereon the fixed image, out of the printer.

A tacho-generator 12, serving as a speed detector is coupled to the motor 20. The detected rotational speed of the motor 20 is fed back to a later-described comparing arithmetic unit 601, which compares it with a set speed to direct the rotational speed of the motor 20. The peripheral speed of the photoconductive drum 1 is brought completely into concidence with that of the pressure roll pair 81. That is, the fan-folded form 10 is driven to travel at the transport velocity corresponding to the peripheral speed of the pressure roll pair 81.

Meanwhile, a heat roll fixing system may of course be adopted instead of the pressure fixing system in this embodiment.

The direction-regulating feed mechanism 9 comprises a pair of endless tension belts 91 and 91 which are arranged respectively below the opposite side edge portions of the fan-folded form 10, traveling from the transferring station 7 toward the fixing station 8 along the predetermined path. The tension belts 91 and 91 extend parallel to the traveling direction.

Each of the tension belt 91 comprise a so-called synchronous belt that is provided on an inner peripheral surface with a plurality of teeth so as to mesh with pulleys 92A and 93A. The tension belts 91 are further provided on an outer peripheral surface with a plurality of projections 91A which are arranged in a single row along the entire periphery of the tension belt 91. The projections 91A on each tension belt 91 are spaced from each other at intervals of ½ inch equal to that of the sprocket holes 10A formed along a corresponding one of the opposite side edges of the fan-folded form 10, so that the projections 91A are engageable, respectively with the sprocket holes 10A shown in FIG. 2.

In the meantime, the projections 91A are spindle shaped, fasilitating the engagement with the sprocket holes 10A.

The tension belt 91 extends between two parallel pulleys 92A and 93A mounted on shafts 92 and 93 that are perpendicular to the feed direction of the fan-folded form 10. The upper path of the belt 91 coincides with the path of the fan-folded form 10.

A power clutch 31 (see FIG. 2) is coupled to one of the shaft 92, causing the shaft 92 to rotate with a predetermined torque. A rotary encoder 13 is coupled to the opposite end of the shaft 92 through a pulley 92B and a belt 13A. The rotary encoder 13 is adapted to produce a signal in synchronism with the projections 91A on the tension belt 91, generating one pulse each time the projection 91A pass by a certain point in its cyclic path.

The pulley 92A is coupled to the shaft 91 through a one-way clutch, not shown, which allows the pulley 92A to rotate with the shaft 92 in the feed direction of the fan-folded form 10, but prevents the shaft 92 from rotating in the reverse direction with only the pulley 92A being idled. The pulley 93A is rotatably mounted on the shaft 93.

Figure 3:
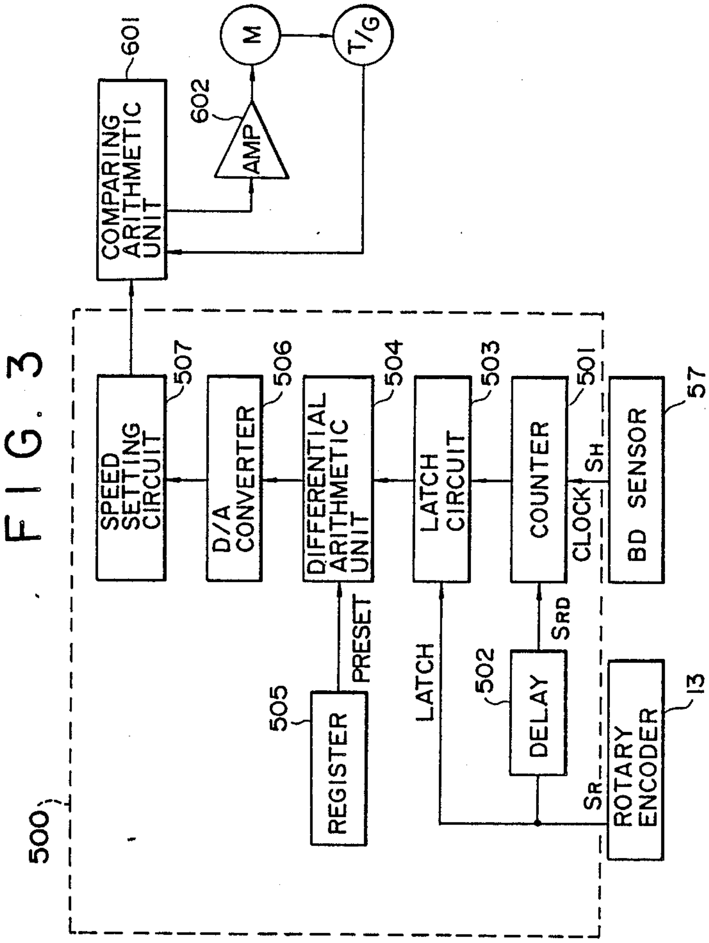
FIG. 3 is a detailed block diagram of the justification system shown in FIG. 2.

Referring now to FIGS. 2 and 3, there is shown a block diagram of a justification system to correct the position of printing on the continuous form 10.

Signal $S_R$ from the rotary encoder 13 serves as a detector for detecting the actual time of each segment of the fan-folded form 10 to pass a certain point in its travel path, having a predetermined length (½ inch in this embodiment) in the feed direction. The signal $S_R$ and signal $S_H$, from a BD (beam detecting) sensor 57, are input to a controller 500 to control an automatic speed control 600 serving as means for controlling the feed speed of the fan-folded form 10.

More particularly, the BD sensor 57 produces a horizontal syschronous signal (pulse signal) when the laser beam scans the photoconductive drum 1 in the main scanning directions, and may comprise a photo detector disposed, as illustrated in FIG. 2, in the path of the main scanning at a position at a predetermined distance away from the photoconductive drum 1 in its axial direction.

A start-write control signal pulse fed to the image information generating circuit; that is a horizontal synchronous signal is generated upon receiving the laser beam by the BD sensor 57. The number of the main scannings may be obtained by counting the signal pulses.

The rotary encoder 13 produces one pulse per pitch of the sprocket holes 10A in the fan-folded form 10, and the period of such pulses corresponds to ½ inch in this embodiment if there is no expansion or contraction of the fan-folded form 10. The number of the main scannings of the laser beam over the photoconductive drum 1 is set to be 120 DPI (dots per inch), as measured in the direction of auxiliary scanning. Therefore, if the number of pulses from the BD sensor 57 is sixty (60) during the interval between adjacent pulses from the rotary encoder 13, this indicates a normal condition in which printing occurs at a predetermined position relative to the rules on the fan-folded form 10. If the number of pulses from the BD sensor 57 is either greater or less than that, printing occurs out of position. Since the relationship between the pitch of the sprocket holes 10A on the fan-folded form 10 and the rules on the fan-folded form 10 are constant, the design is so selected as to produce one pulse per pitch of the sprocket holes 10A in the fan-folded form 10 instead of providing one pulse per pitch of the rules.

Referring to FIG. 3, a more detailed block diagram of the justification system is illustrated.

The signals, from the BD sensor 57 are inputted to a clock input of a counter 501, which of the controller 500, functions as a means for counting the number of main scannings over the photoconductive drum 1. The counter 501, counts 120 pulses per inch in the preferred embodiment, only because 120 DPI is selected as the number of the main scannings over the photoconductive drum 1.

The signal $S_R$ from the rotary encoder 13 is input to a delay circuit 502 that produces a delayed signal $S_{RD}$ that is sent to a reset input of the counter 501. The rotary encoder 13 generates one pulse of the signal $S_R$ per pitch of the sprocket holes 10A on the fan-folded form 10 because the rotary encoder 13 operates in synchronism with the projections 91A on the tension belt 91. Therefore, one pulse of the signal $S_R$ is produced during the time taken to feed the fan-folded form 10 by ½ inch, so long as there is no expansion or contraction of the fan-folded form 10. The interval of pulses of the signal $S_{RD}$ matches that of the signal $S_R$ because the former signal is merely delayed relative to the latter by means of the delay circuit 502.

Figure 4:
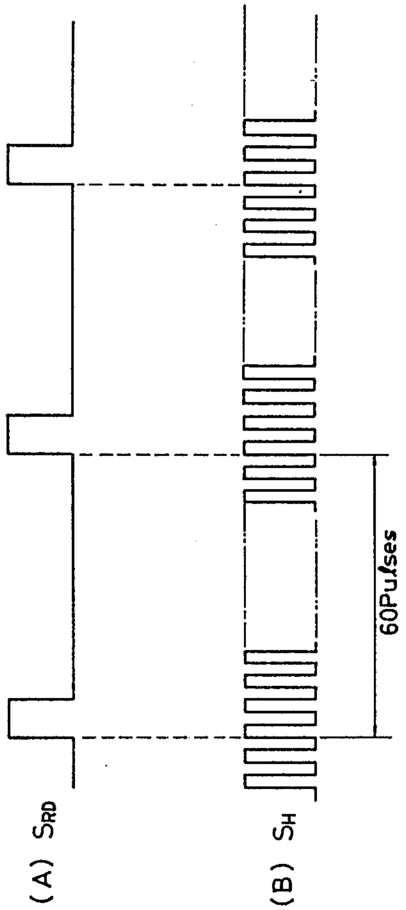
FIG. 4 is a timing chart of input signals to the controller used in the justification system shown in FIG. 2.

FIG. 4 illustrates the waveform of signals $S_H$ and $S_{RD}$ inputted to the counter 501. $S_{RD}$, shown in part (A), is a signal supplied from the delay circuit 502 to the counter 501 for resetting; the pulse interval thereof corresponds to that of the signal $S_R$, as stated above. $S_H$, shown in part (B), is a signal supplied from the BD sensor 57 to the counter 501 for resetting; its pulse repetition rate is 120 pulses per inch, as stated above. Therefore, the counter 501 normally counts 60 pulses during the period of the signal $S_{RD}$.

Preferring once more to FIG. 3, the counted value in the counter 501 is supplied to a latch circuit 503, which latches the counted value and supplies it to a differential arithmetic unit 504 that serves as a means for comparing the counted value with a reference value. The latch operation of the latch circuit 503 occurs at the pulse interval of the signal $S_R$. The counter 501 must be reset at the pulse interval of the signal $S_R$. However, if the counter 501 is reset at the same time as the latch circuit 503, the counted value in the counter 501 is cleared before it is latched in the latch circuit 503.

To avoid this, the following operation is required. The latch circuit 503 first latches the counted value in the counter 501 in response to the signal $S_R$ and thereafter, the counter 501 is reset for the next counting operation. To achieve this, the signal $S_R$ is delayed by the delay circuit 502 to produce the delayed signal $S_{RD}$, which is used to reset the counter 501. The amount of the delay is selected so that the pulse of the delayed signal $S_{RD}$ occurs after that of the signal $S_R$, but before the next pulse of the clock signal $S_H$.

The differential arithmetic unit 504 compares the counted value from the latch circuit 503 with a reference value preset in a register 505 and outputs the difference to a D/A (digital to analog) converter 506. The counted value in the counter 501 of the preferred embodiment is sixty (60) when the printer operates normally. Thus, with the arrangement in which the register 505 is preset at a reference value of sixty (60) the differential arithmetic unit 504 provides an output given by the reference value minus the output of the latch circuit 503; the output of the unit 504 will be zero in the normal condition and will increase or decrease as the counted value in the counter 501 decreases or increases.

The D/A converter 506 converts the digital signal from the unit 504 to the corresponding analog signal and supplies it to a speed setting unit 507.

Thus, the analog signal from the D/A converter 506 sets the speed setting unit 507 to a corresponding value. In the normal condition, the output from the unit 504, is zero, and the set value corresponds to zero via the D/A converter 506. This defines the normal set value. When an abnormal condition occurs for any reason, the output from the unit 504 increases or decreases in proportion to the abnormal state. If the comparison output increases, the speed setting unit 504 is set by way of the D/A converter 506 to the value corresponding to the normal set value minus the increase. If the comparison output decreases, the speed setting unit 507 is set to the value corresponding to the normal set value plus the decrease.

A comparing arithmetic unit 601, of the automatic speed control unit 600, compares the speed set value from the speed setting unit 507 with the output from the tacho-generator 12 i.e., the detector for detecting the revolutional speed of the motor 20, and supplies a difference or error signal to an amplifier 602. The amplified signal is fed to the motor 20 to control and stabilize the revolutional speed of the motor 20 at the set value.

Thus, the comparing arithmetic unit 601 and the motor 20 form a closed loop via the tacho-generator 12, i.e., a negative feedback loop, thus defining an automatic control system for stabilizing the revolutional speed of the motor 20.

Figure 5:
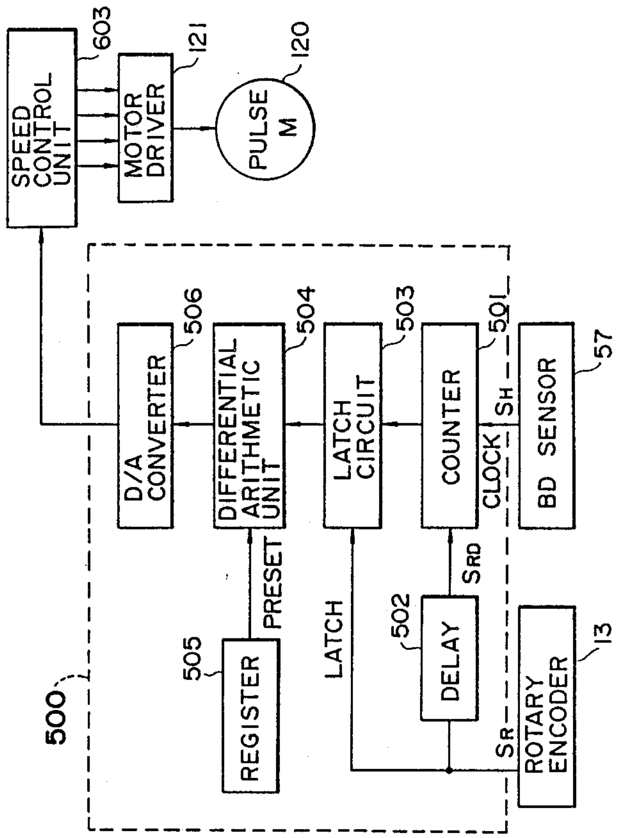
FIG. 5 is a detailed block diagram of a modified justification system employing a pulse motor.

In another embodiment shown in FIG. 5, an automatic control system may comprise a PLL (phase locked loop) in order to control the motor 20. In such a case, the controller 500 supplies a signal in the form of a frequency signal to the automatic control unit 600, which is in turn locked at the frequency to control the motor 20 toward a stabilized state. It is necessary, however, to employ a pulse generator instead of the tacho-generator 12.

The justification system constructed as stated above operates as follows. In the normal condition, where the printing occurs at a predetermined position relative to the rules on the fan-folded form 10, the set value in a speed setting circuit 507 is constant as stated so that the motor 20 is stabilized.

When the fan-folded form 10 expands or contracts, the rules on the form 10 change in pitch. Therefore, the pitch of the sprocket holes 10A on the form 10 varies as well. This results is a change in the size of the print segment. Such a change influences the actual time to move the tension belt 91, driven by the sprocket holes 10A in engagement with the projections 91A on the belt 91. Since the encoder 13 generates a signal in synchronism with the movement of the tension belt 91, the time change is reflected in the pulse interval of the output of the rotary encoder 13. Since the change in the pulse interval is the change in the period of the reset signal $S_{RD}$ fed to the counter 501, the counted value increases or decreases depending on the change in the period of resetting. Correspondingly, the output of the unit 504 decreases or increases, causing the speed setting value in the speed setting unit 507 to vary by way of the D/A converter 506. As a result, the automatic control system 600 controls the speed of the motor 20 in accordance with the changed set value in the speed setting circuit 507, whereby printing is corrected so as to always occur at a predetermined position relative to the rules on the fan-folded form 10.

Even if the actual time required to feed each segment of the continuous form 10 is maintained to be constant, positional printing errors can occur arising from the variations in rpm of the motors for scanning the photoconductive drum 1 and the exposure system due to fluctuations in the supply voltage, aging etc. In such cases, the reset interval of the signal $S_{RD}$ is constant, but the clock signal $S_H$ is subject to variations. The justification system operates in a similar manner as above, correcting the printing errors.

Although in the aforementioned embodiment, the setting speed in the circuit 507 is updated every pulse of the signal $S_R$ corresponding to the pitch of the sprocket holes 10A in the fan-folded form 10, the rate of updating the setting speed may be lowered in the view of a slow response of the automatic speed control system 600 for the motor 20 and the accuracy of printing per se on the fan-folded form 10. A practical printing position control may be achieved by generating a page signal having a frequency of one page of the fan-folded form 10 and updating the setting speed at the frequency of the page signal.

Further, photo detectors or micro-switches may be used to detect the actual time to feed each segment of the continuous form 10.

Moreover, a pulse motor can be employed instead of the DC (direct current) motor 20 as shown in FIG. 5. In this case, the output of the DA converter 506 is fed to a speed control unit 603 for controlling a revolutional speed of a pulse motor 120 through a motor driver 121. A speed control unit 603 generates and outputs phase pulses that are fed to the motor driver 121.

What is claimed is:

1. A justification system for use in an electrophotographic printer for controlling a feed mechanism for a recording medium, comprising:

- means for sensing a signal pulse representing a main scanning of a photoconductive drum;
- means for counting the number of said main scanning of said photoconductive drum;
- means for monitoring a difference between said counted number of main scannings and a predetermined reference value; and
- means for controlling the speed of a motor that controls the movement of said recording medium in response to an output signal from said monitoring means.

2. The justification system of claim 1, further comprising means for converting said output signal from said monitoring means into an analog signal for controlling the speed of said motor to thereby control the speed of said recording medium.

3. The justification system of claim 1, wherein said motor is connected to a pair of pressure rollers that draw said recording medium through said printer.

4. The justification system of claim 1, wherein said sensing means comprises a beam detector.

5. The justification system of claim 1, wherein said counting means includes a means for resetting to zero the counting of the number of said main scannings of said photoconductive drum.

6. The justification system of claim 1, further comprising a means for comparing the rotational speed of said motor to ensure that said motor rotates at the speed set by said controlling means.

7. The justification system of claim 1, further comprising a motor driver circuit that accepts a signal produced by said controlling means and generates phase pulses that control said motor, said motor comprising a pulse motor.

8. A justification system for use in an electrophotographic printer for controlling a feed mechanism for a recording medium, comprising:

- a beam detector that functions to detect a main scanning over a photoconductive drum in said printer;
- means for detecting movement of said feed mechanism, said feed mechanism generating pulse signals for each predetermined movement of said recording medium feed mechanism;
- means for counting said main scannings detected by said beam detector to produce a count signal,
- means for using said pulse signals to reset said counting means at preselected intervals;
- means for storing a predetermined reference value;
- means for calculating a difference signal representing the value of said predetermined reference value minus said count signal; and
- means for setting the rotational speed of a motor that operates said recording medium feed mechanism based on said difference signal produced by said calculating means.

9. The justification system of claim 8, further comprising means for comparing the actual rotational speed of said motor to the rotational speed of said motor set by said setting means.

10. The justification system of claim 9, wherein a tacho-generator produces a signal representing the actual rotational speed of said motor, said signal being supplied to said setting means to adjust the rotational speed of said motor to equal said set rotational speed.

11. The justification system of claim 8, further comprising a motor driver which converts a signal produced by said setting means into a control signal for operating said motor.

12. The justification system of claim 11, wherein said control signal comprises phase pulses that are supplied to said motor, said motor comprising a pulse motor.

13. The justification system of claim 8, further comprising a digital to analog converter which converts said difference signal to an analog difference signal that is supplied to said setting means.

14. The justification system of claim 8, wherein said detecting means comprises a rotary encoder.

15. The justification system of claim 8, wherein said detecting means comprises a rotary encoder that is coupled to said feed mechanism which provides a tension to said recording medium, said feed mechanism being driven by the movement of said recording medium.

16. A justification system for use in an electrophotographic printer in which the surface of a photoconductive drum is main scanned by a source of illumination in the direction of the axis of the photoconductive drum and a recording medium is fed past said photoconductive drum at a predetermined rate by a feed mechanism provided with a plurality of print segments, said justification system comprising:

means for detecting a period for each print segment of said recording medium that passes a predetermined point on a travel path of said recording medium;

means for counting the number of main scannings that occur during each period that is detected by said detecting means;

means for comparing the number of main scannings that are counted by said counting means during each period with a predetermined reference value; and means for adjusting said feed rate of said recording medium if said comparing means determines that there is a difference between the number of main scannings counted during each period and said predetermined reference value.

17. The justification system of claim 16, wherein said counting means includes a means for resetting to zero the counting of the number of said main scannings.

18. The justification system of claim 16, wherein said detecting means comprises a rotary encoder that is coupled to said feed mechanism to generate one pulse each time the recording medium passes the predetermined point on the travel path.

19. The justification system of claim 18 wherein said feed mechanism further comprises means for detecting a print segment of said recording medium, wherein said feed mechanism is provided with a plurality of sprockets that engage said print segments of said recording medium, each print segment containing a predetermined number of sprocket holes, said print segment detecting means operating to produce a signal when it has detected that the predetermined number of sprockets have passed the predetermined point on the travel path of said feed mechanism.

20. The justification system of claim 19, wherein said print segment detecting means comprises a tractor belt that is rotated about said feed mechanism by the movement of said sprockets, a tacho-generator monitoring the rotational speed of said tractor belt.

21. The justification system of claim 16, wherein said comparing means comprises a differential arithmetic circuit that outputs a difference signal that is indicative of the difference between said main scannings that are counted by said counting means and the predetermined reference value.

22. The justification system of claim 16 further comprising means for comparing the actual rotational speed of said feed mechanism to the rotational speed of said feed mechanism set by said adjusting means.

* * * * *

UNITED STATES PATENT AND TRADEMARK OFFICE
CERTIFICATE OF CORRECTION

PATENT NO. : 4,912,490

DATED : March 27, 1990

INVENTOR(S) : Ikuo NEGORO et al.

It is certified that error appears in the above-identified patent and that said Letters Patent is hereby corrected as shown below:

In the Abstract, bottom line, change "such," to ---, such---.

Column 1, line 7, change "related" to ---relates---.

Column 2, line 3, change "rmp" to ---rpm---.

Column 3, line 32, change "81A and 81B" to ---81B and 81A---.

Column 3, line 36, change "81A and 81B" to ---81B and 81A---.

Column 3, line 62, change "concidence" to ---coincidence---.

Column 4, line 8, change "belt" to ---belts--- and change "comprise" to ---comprises---.

Column 4, line 22, change "fasilitating" to ---facilitating---.

Column 4, line 29, insert ---end--- after "one".

Column 4, line 36, change "pass" to ---passes---.

Column 4, line 37, change "91" to ---92---.

Column 4, line 57, change "syschronous" to ---synchronous---.

UNITED STATES PATENT AND TRADEMARK OFFICE

CERTIFICATE OF CORRECTION

PATENT NO. : 4,912,490

DATED : March 27, 1990

INVENTOR(S) : Ikuo Negoro et al.

It is certified that error appears in the above-identified patent and that said Letters Patent is hereby corrected as shown below:

Column 4, line 63, insert ---is--- before "fed".
Column 5, line 25, delete "which" after "501,".
Column 5, line 26, insert ---which--- after "500,".
Column 5, line 56, change "Preferring" to ---Referring---.
Column 6, line 16, insert ---,--- after "(60)".
Column 6, line 27, delete "," after "504".
Column 6, line 33, change "504" to ---507---.

Signed and Sealed this

Twenty-third Day of June, 1992

*Attest:*

DOUGLAS B. COMER

*Attesting Officer*

*Acting Commissioner of Patents and Trademarks*